(12) United States Patent
Bach

(10) Patent No.: US 9,428,096 B1  
(45) Date of Patent: Aug. 30, 2016

(54) HAY STRAPPING HOOK

(71) Applicant: Terry Lee Bach, Custer, OK (US)

(72) Inventor: Terry Lee Bach, Custer, OK (US)

( * ) Notice: Subject to any disclaimer, the term of this patent is extended or adjusted under 35 U.S.C. 154(b) by 0 days.

(21) Appl. No.: 14/790,024

(22) Filed: Jul. 2, 2015

(51) Int. Cl.
*B60P 7/08* (2006.01)

(52) U.S. Cl.
CPC ................................. *B60P 7/0853* (2013.01)

(58) Field of Classification Search
CPC .......................... B60P 7/0853; B60P 7/0807
USPC ......... 410/96, 97, 98, 100, 156; 16/426–429
See application file for complete search history.

(56) References Cited

U.S. PATENT DOCUMENTS

| 7,044,700 B2 * | 5/2006 | Tessier | B60P 7/083 410/100 |
| 7,866,925 B1 * | 1/2011 | Matlack | B60P 7/14 410/100 |
| 8,915,685 B2 * | 12/2014 | Flores | B60P 7/0853 410/99 |

* cited by examiner

*Primary Examiner* — Stephen Gordon

(74) *Attorney, Agent, or Firm* — Marina V. Mikhailova

(57) ABSTRACT

A hay strap hook for positioning and holding a strap straight in place over rows of hay stacks or bales on a trailer for tightening the strap in place is disclosed. The hay strap hook is comprised of two upper vertical arms that are connected at their lower end individually to one end of two horizontal arms, two lower vertical arms connected at their upper end individually to other end of the two horizontal arms, a central bar joining the two horizontal arms together, and a pole joined at the center of the bottom of the central bar. To use the hay strap hook, use the pole to reach the straps on the top of the hay bales, use the upper vertical arms to lift the strap, turn the hook half over and poke the pointed ends into a hay bale that is held by the strap while tightening the strap across hay bales to trailer on other side.

8 Claims, 2 Drawing Sheets

HAY STRAPPING HOOK

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present invention generally relates to a hay strapping tool. More particularly, the present invention relates to "a hay strap hook for positioning and holding a strap in place over rows of hay stacks or bales on a trailer for tightening the strap in place on the trailer".

(2) Background of Invention

Forage crops are a major source of feed for dairy animals like cows, sheep, etc. Forage crops generate large amount of hay as feed. Hay is typically arranged as a hay stack or rolled into hay bales for easy handling and transport to different locations. Common hay configurations include single stack, double stack, round bale, and square bale. Once the hay stack or bales are loaded onto a trailer, the multiple hay stacks or bales are held together by tying them to keep them from shifting, sliding, or toppling during carriage. The hay stacks or bales are commonly tied together with a strap or a belt. Generally, the strap is a two inch wide strap that is formed of a flexible material that has high tensile strength. For a stronger hold over the multiple hay stacks or bales, the strap should ideally pass over the middle line of the top surface of the top hay stack or bale. For this process of positioning the strap over hay stacks or bales over trailers, straps have to be thrown approximately 14 feet in the air and then over the rows of the hay stacks or bales from one side of the trailer. The strap thrown this way tends to fall towards the side regions of the top surface of the top hay stack or bale, and may even fall over the side, causing the operator to throw the strap again, thus making the strapping process for securing hay stacks or bales on a trailer difficult and time consuming. This is particularly difficult in the windy conditions. Furthermore, many times, a person may have to climb up the rows of hay stacks or bales on the trailer to position the strap, which may become dangerous. Some loading mechanisms have been developed to load a trailer with hay stacks or bales while securing the hay stacks or bales in place with straps. For example, U.S. Pat. No. 7,044,700 B2, issued to Willi Hermann Hesse on 2006, May 16, discloses a strapping system comprised of a pair of elongate rollers, a frame for supporting the rollers on trailer, strapping members secured to roller, and anchor and tightening mechanisms for securing and tightening the straps over the hay bales placed on the trailer or truck. Similarly, U.S. Pat. No. 7,866,925 B1, issued to Stinger, Inc. on 2011, Jan. 11, discloses an assembly for securing cargo on a load bed assembly that allows efficient strapping of the hay bales that are placed on a trailer. However, these machines are costly, their handling is difficult, and they do not efficiently solve the issue of positioning the strap over the hay strap to tighten the strap on the other side of the trailer. Hence, there is a need for methods and tools to efficiently perform the strapping process on trailers. Furthermore, it is desired that the tool is easy to handle and use, and is cheap.

It is an objective of the invention to overcome or alleviate a problem of the prior art.

This permits the use of the present invention, which enhances the prior art of hay strapping tools for efficiently strapping rows of hay stacks or bales on a trailer.

BRIEF SUMMARY OF THE INVENTION

In view of the foregoing, one aspect of the various disclosed embodiments in the present invention is to provide a hay strap hook to position and hold the strap in place over rows of hay stacks or bales on a trailer so that the strap may be tightened in place over the trailer.

Preferably, the hay strap hook addresses, or at least ameliorates, one or more of the problems described above. To this end, the present invention, related to a hay strap hook, with some unique aspects, is disclosed.

Accordingly, it is a primary objective of the present invention to provide a hay strap hook to position and hold the strap in place over rows of hay stacks or bales on a trailer so that the strap may be tightened in place over the trailer.

It is yet another objective of the present invention that the hay strap hook is easy to use.

It is yet another objective of the present invention that the hay strap hook is lightweight.

It is still another objective of the present invention that the hay strap hook is made of a sturdy material.

Other objectives of the present invention will become apparent, from time to time, throughout the specification, as hereinafter related.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. Also, it is to be understood that the phraseology and terminology employed herein are for the purpose of description, and should not be regarded as limiting.

These, together with other objectives of the invention and the various features of novelty that characterize the invention, are pointed out with particularity in the disclosure. For a better understanding of the invention, its operating advantages, and the specific objectives attained by its uses, reference should be had to the accompanying drawings and descriptive matter, in which there are illustrated preferred embodiments of the invention.

BRIEF DESCRIPTION OF THE SEVERAL VIEWS OF THE DRAWINGS

To further clarify various aspects of some example embodiments of the present invention, a more particular description of the invention will be rendered by reference to specific embodiments thereof, which are illustrated in the appended drawing. It is appreciated that the drawing depicts only illustrated embodiments of the invention, and is, therefore, not to be considered limiting of its scope. The invention will be described and explained with additional specificity and detail through the use of the accompanying drawing, in which.

DETAILED DESCRIPTION OF THE INVENTION

The following detailed description of the present invention enables the teaching of the invention and its best, currently known embodiment. Those skilled in the art can understand that many changes can be made in the embodiments described while still obtaining the beneficial results of the present invention. It will also be apparent that some of the desired benefits of the present invention can be obtained by selecting some of the features of the invention while not utilizing other features. Accordingly, those working in the relevant art will recognize that many adaptations and modifications to the present invention can be made and may be desired in certain circumstances, and are part of the present invention. Thus, the following description is provided as illustrative of the principle of the present invention.

Embodiments of the present invention provide a hay strap hook for positioning and holding a strap in place over rows of hay stacks or bales on a trailer so that the strap may be tightened in place over the trailer. Accordingly, the specific embodiments discussed herein are merely illustrative of specific manners in which to make and use this invention, and are not intended to represent an exhaustive list of all possible structure and processes of the present invention. The present invention has been described herein in respect to a trailer. However, the inventive concepts described herein are applicable to any truck, truck-tractor, semi-trailer, or other vehicles that are used for hay hauling.

Embodiments of the method are shown in the figures, and discussed below. While the structure and processes have been described with a certain degree of particularity, it is to be noted that many modifications may be made in the details of the structure and processes without departing from the spirit and scope of this disclosure. It is understood that the structure and processes are not limited to the embodiments set forth herein for purposes of exemplification.

Aspects of the present inventive subject matter are described with reference to the figures provided herein.

Figure 1:
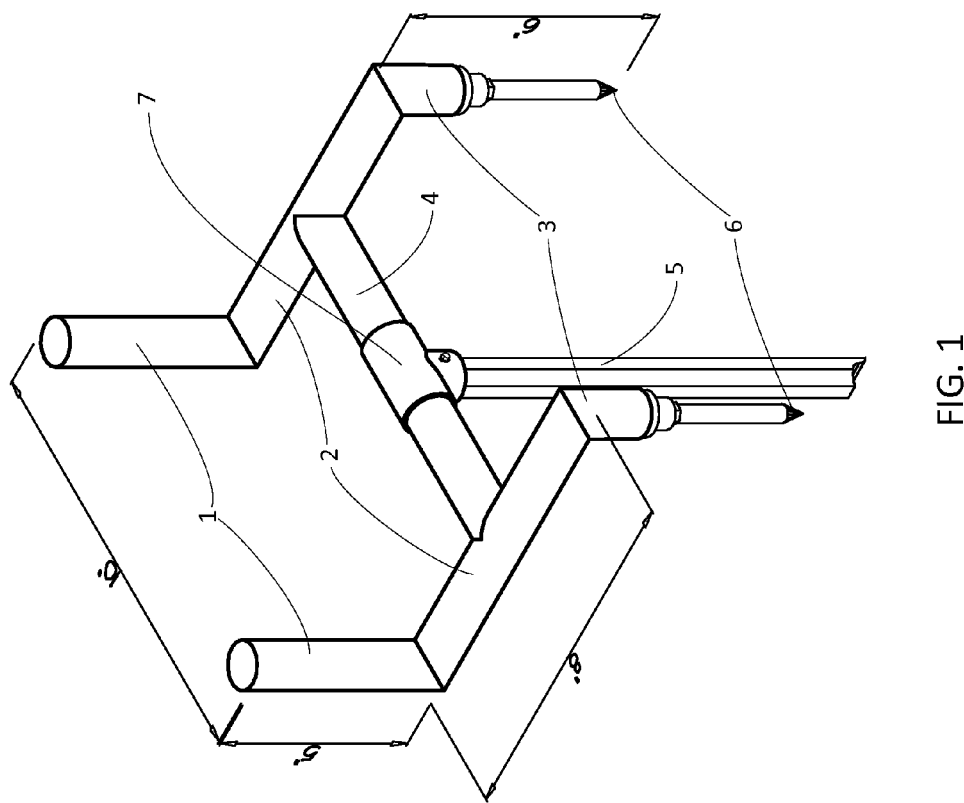
FIG. 1 shows a perspective view of a hay stack hook.

The present invention provides a hay strap hook. FIG. 1 shows an exemplary representation of the hay strap hook. The hay strap hook is made of two upper vertical arms 1, two horizontal arms 2, two lower vertical arms 3, a central bar 4, and a pole 5. Each of the two upper vertical arms is attached to one end of a horizontal arm of the two horizontal arms by a suitable connecting means. The connecting means may be 90 degree elbow pipe joint. Each of the two lower vertical arms is attached at its upper end to the other end of a horizontal arm of the two horizontal arms by a suitable connecting means. The connecting means may be 90 degree elbow pipe joint. Each of the two lower vertical arms has pointed end 6 on its lower end. The central bar is attached at its two ends to the center of the two horizontal arms by a suitable connecting means. The connecting means may be T-shaped joint. A pole is attached in the center of the bottom surface of the central bar by a suitable connecting means. The connecting means may be T-shaped joint 7. The pole may be attached to the central bar by bolting or screwing in.

Figure 2:
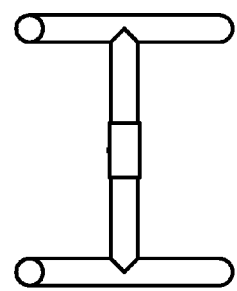
FIG. 2 shows a top view of a hay stack hook.
Figure 3:
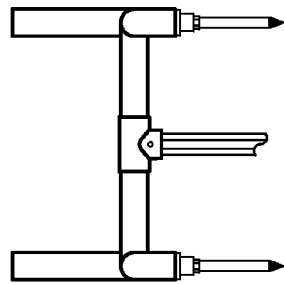
FIG. 3 shows a front view of a hay stack hook.
Figure 4:
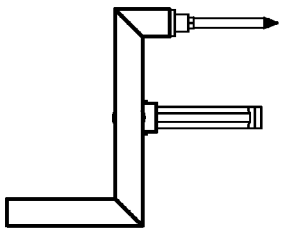
FIG. 4 shows a left side view of a hay stack hook in use.

FIG. 2-4 shows top, front and left side views of the invention. The hay strap hook of the present invention can have its two upper vertical arms, two horizontal arms, two lower vertical arms, central bar, and the pointed ends of the two lower vertical arms made into a single piece through a molding process. In a preferred embodiment of the present invention, each of the two upper vertical arms is five inches long, each of the two horizontal arms is eight inches long, each of the two lower vertical arms is six inches, and the central bar is ten inches long. In a preferred embodiment of the present invention, the hay strap hook weighs 3 pounds.

The hay strap hook is used to hold the strap straight and in place on single or double stack, square, or round bales while tightening the strap's other side down on a trailer to haul the hay to a different location. This is especially useful when there is a windy condition, which makes it difficult to keep the strap in position on the hay stacks and bales and, thus, makes the hay hauling process more time consuming.

Figure 5:
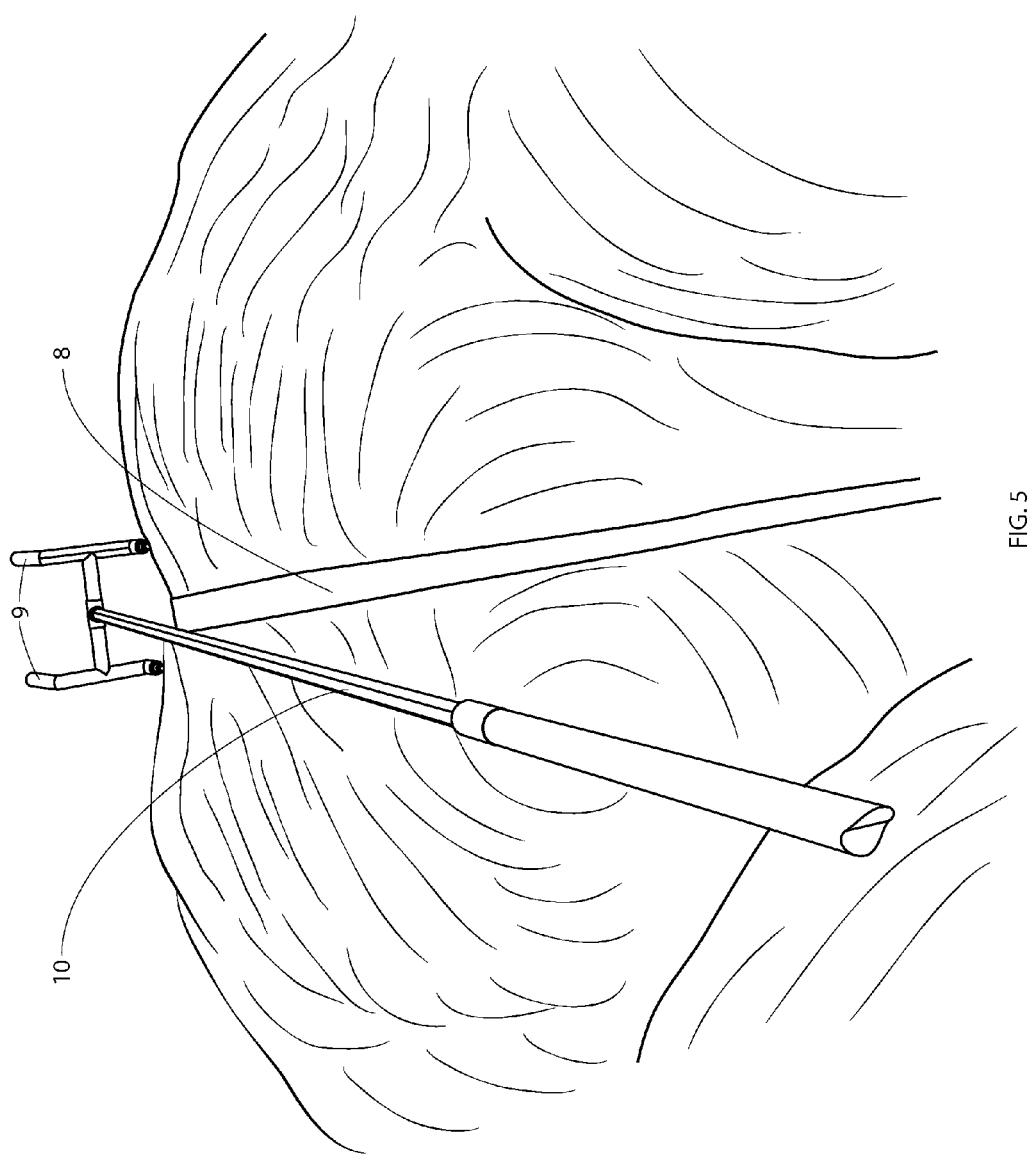
FIG. 5 shows another perspective view of a hay stack hook in use

FIG. 5 shows the hay strap hook in use. Once the straps 8 are thrown across the rows of hay bales, the upper vertical arms 9 of the hay strap hook are used to lift the strap that has been placed on top of the rows of hay bales. The hay strap hook is then turned half over. The pointed ends are then poked into the hay bale on top of the rows of said hay bales that are held by the strap while the strap is tightened across the rows of hay bales to the trailer on other side. The pole 10 is useful to reach the straps on the top of the rows of hay bales, which may be approximately 14 feet tall. The length of the pole will be sufficient to easily reach the 14 feet high pool of hay stacks on the trailer. The hay strap hook can be also be used to secure and tighten straps during hay hauling on a trailer. During use, the hay strap hook is hand held and manually operated.

The hay strap hook saves time and is also safer than having to climb on top of the hay to straighten the straps. The hay strap hook of the present invention can be made of a sturdy material, including but not limited to metal, plastic, and wood. In a preferred embodiment, the hay strap hook is made of molded plastic. The hay strap hook may be available in different colors. It is preferred that the hay strap hook is black colored.

It is to be understood that the above description is intended to be illustrative, and not restrictive. For example, the above discussed embodiments may be used in combination with each other. Many other embodiments will be apparent to those of skill in the art upon reviewing the above description.

Plural instances may be provided for components, operations, or structures described herein as a single instance. Finally, boundaries between various components, operations, and elements are somewhat arbitrary, and particular operations are illustrated in the context of specific illustrative configurations. Other allocations of functionality are envisioned, and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

I claim:

1. A hay strap hook for positioning and holding a strap straight in place over rows of hay bales, the hay strap hook comprising:

two horizontal arms, each of said horizontal arms having a first end and a second end;

two upper vertical arms, a lower end of each of said upper vertical arms attached to a respective said first end of one of said horizontal arms by a connecting means;

two lower vertical arms, each of said lower vertical arms attached at a respective upper end of the lower vertical arms to a respective one of the second ends of said horizontal arms by a connecting means, a lower end of each of said lower vertical arms having a pointed end;

a central bar having a first end and a second end, each of said ends of said central bar connected to a respective center of said two horizontal arms by a connecting means; and a pole connected in a center of a bottom surface of said central bar by a connecting means.

2. The hay strap hook of claim 1, wherein said connecting means joining each said upper vertical arm with a respective said horizontal arm is a 90 degree elbow pipe.

3. The hay strap hook of claim 1, wherein said connecting means joining each said lower vertical arm with a respective said horizontal arm is a 90 degree elbow pipe.

4. The hay strap hook of claim 1, wherein said connecting means joining said respective central bar ends with a respective horizontal arm is a T-shaped joint.

5. The hay strap hook of claim 1, wherein said connecting means joining said pole with said central bar is a T-shaped joint.

6. The hay strap hook of claim 1, wherein said pole is connected to said central bar by bolting or screwing in.

7. A hay strap hook of claim 1, wherein said hay strap hook weighs three pounds.

8. A method for positioning and holding a strap straight in place over rows of hay bales on a trailer by using the hay strap hook of claim 1 comprising of steps:

reaching a strap placed on top of rows of said hay bales using said pole;

lifting said strap placed on top of rows of said hay bales using said upper vertical arms;

turning said hay strap hook half over;

poking said pointed ends into a hay bale on top of rows of said hay bales being held by said strap;

tightening said strap across rows of said hay bales to said trailer on a side.

* * * * *